Figure 1:
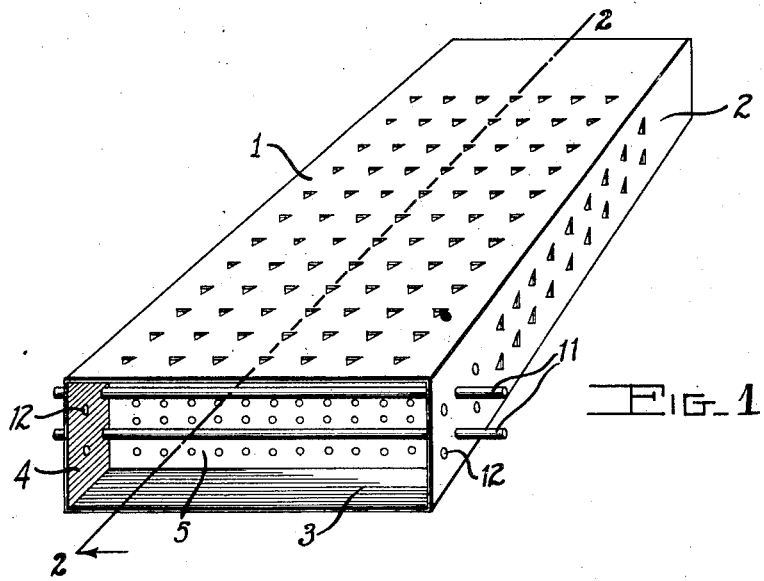

Nov. 17, 1931.  L. L. WAGNER  1,831,982
SILICATE BONDED MATERIAL AND PROCESS OF MAKING SAME

Filed Dec. 6, 1926

INVENTOR
Lawson L. Wagner

By A. B. Foster ATTY.

Patented Nov. 17, 1931

1,831,982

UNITED STATES PATENT OFFICE

LAWSON L. WAGNER, OF NEW YORK, N. Y.

SILICATE BONDED MATERIAL AND PROCESS OF MAKING SAME

Application filed December 6, 1926. Serial No. 153,001.

The present invention relates to the production of bodies containing kieselguhr (diatomaceous earth) having high heat insulating and refractory properties, capable of use for insulating the lining of furnaces, for filtering liquids and gases, for insulating building material, in its soft form as colored marking material; lining of refrigerators and refrigerator cars, cold storage plant insulation, absorbent for explosives, such as oxygen, electrical insulators, in its dense form as a body to receive the markings of crayons etc; and has for one of its objects the uniting of the diatoms in a mass, in substantially their natural and unbroken condition by means of silicates, in a more uniform and natural condition than has heretofore been the case, to create a synthetic product more uniform than natural diatomaceous earth, yet retaining all its beneficial properties. Another object of the invention consists in the controlled prior shrinkage of the product formed as required by some of the uses to which it is to be put. Other objects will either appear obvious or will be pointed out in the description which follows.

According to the process of my invention there is added to small particles or diatoms of kieselguhr, either in the cleaned or uncleaned state, a small percentage of finely divided hydrated calcium lime. These two ingredients are thoroughly mixed in a centrifugal air mixer or in any other satisfactory manner and then moisture is added to the mixture either by means of a vapor spray or steam. The mixture is preferably formed by mixing air currents respectively carrying particles of lime and kieselguhr as fluent solids, and thereafter separating the mixture of solids as a mixture from the air by filters or gravity separators. During the addition of the moisture the kieselguhr and lime should be thoroughly mixed, in the centrifugal mixer referred to above where the moisture may be added, until the moisture is evenly distributed throughout the mass. The water or moisture may, however, be added to the mixed lime and kieselguhr in a separate mixer. Only enough water should be added to render the mass of ingredients moldable under pressure in molds and such quantities of water should be avoided in the mass as will cause the exudation of moisture from the molds when pressure is applied to the mold contents, as such water will carry off part of the lime either in solution or in suspension and will further produce uneven or irregular impregnation of the mass of kieselguhr particles by means of the lime. The oxide or hydroxide of calcium may be added to the kieselguhr in the form of lime water, any excess moisture being evaporated before steaming. If the kieselguhr has not been dried, enough water or moisture is present in many cases to hydrate the lime which can then be added to the kieselguhr as finely ground and unslacked calcium oxide. While the mixture of hydrated lime and kieselguhr may be rendered more or less plastic by the addition of water, plasticity is not necessary to the successful operation of the process as the material may have no plasticity at all or in the vernacular, of the trade it may be, "short". This characteristic is impossible with any other known method of producing artificially molded objects from kieselguhr either in its pure state or with it predominating by volume in the mixture. The relative proportions of the several ingredients may vary within the following limits: pulverized kieselguhr 20% to 99% parts by weight, hydrated lime ½% to 50% parts by weight, water as desired, and sand, silicates or foreign material found in impure kieselguhr to the extent necessary to make up 100%. The process may be practiced and the product formed also without the addition of moisture to the mixed kieselguhr and hydrated lime after the thorough mixing of these two ingredients. In this case the mixed hydrated lime and kieselguhr, without the addition of moisture, is tamped or packed into the molds in an exactly similar manner as the moist mixture. In either case the perforations or other ports of entry for steam in the molds, hereinafter described, must be so positioned or proportioned in size as to prevent the material from escaping from the mold through them.

The mixture of hydrated lime, kieselguhr and water or of kieselguhr and hydrated lime, without addition of water, thus formed is then pressed or tamped into a perforated or steam permeable mold or molds having a movable head or heads or plungers which admit or permit the material to be confined in the molds when necessary under considerable pressure as high as 3000 pounds per square inch or more. The movable heads should be provided with any suitable locking means to hold the confined or compacted material during the curing or steaming operation, hereinafter referred to, under the pressure to which it has been subjected before the curing operation and any additional pressure generated during this latter operation. That is to say, the mold is so constructed as to substantially prevent any expansion of the material during the steaming or curing operation. The mold should have perforated walls or other ports to permit the ingress of steam during the curing or steaming operation. The product may also be cured in a tight mold, the steam being generated from the moisture content of the mixture when heat is applied externally or otherwise.

The curing or steaming is accomplished by subjecting the confined mass of lime and kieselguhr, while preventing expansion in the mold, to the action of steam at a pressure of from about 5 to 200 pounds or more per square inch for a period of from about 4 to 70 hours. After this curing operation the material is ejected from the mold either in the form of the article desired, or in the form of slabs or blocks, depending upon the character of the mold used. The slabs or blocks or other unshaped pieces may be cut in smaller articles or shaped into any desired product.

It is found to be necessary to the production of a mass of desired strength and insulating qualities that the material be held under compression or expansion be prevented during the steaming or curing treatment. By this means expansion of the mass is prevented before the silicate bonding action takes place. That is to say, the particles of kieselguhr are held substantially in the same relative positions to each other while the lime is being converted into calcium silicate to bind the kieselguhr particles together. In this manner a firm union between the kieselguhr particles is attainable, since the knitting together of the particles by calcium silicate is produced to a greater extent than where the kieselguhr particles are constantly being separated from each other by expansion during the formation of the calcium silicate bond. By increasing or decreasing the pressure within the mass of material during curing the porosity or strength of the final product may be either increased or decreased as desired.

Figure 2:
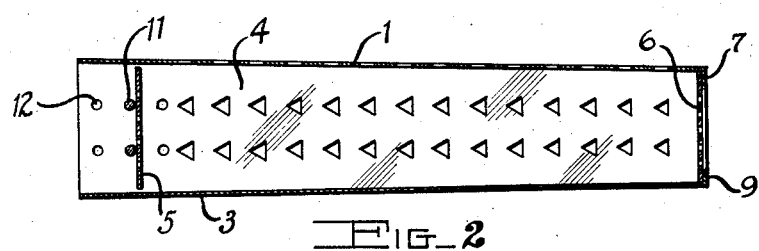
Figure 3:
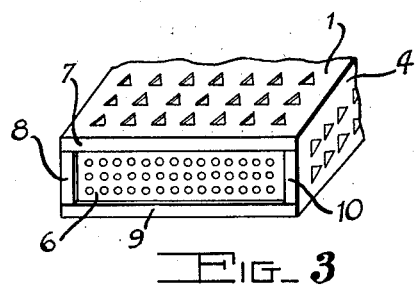

A suitable mold for carrying out the process and for forming the product is shown in the accompanying drawings wherein similar reference characters indicate corresponding parts and wherein Fig. 1 is a perspective view of the mold, Fig. 2, a cross section on the line II—II of Fig. 1 and Fig. 3 a perspective view of a part of the mold at the smaller end.

The mold shown in the drawings is formed of a suitable metal as iron or steel, or refractory material, or an alloy, both of which latter being capable of resisting high temperatures of about 2200° F., and has four sides 1, 2, 3 and 4 and two removable ends 5 and 6. The end 6 is smaller than the end 5, and the sides 1, 2, 3 and 4 are tapered in the direction of the smaller end so that the shape of the mold is somewhat similar to a truncated pyramid having its base in the shape of a rectangle. The sides 1, 2, 3 and 4 are provided with triangular openings for the purpose permitting the ingress of steam and for facilitating the ejection of the finished product from the mold. When pressure is applied to the mass or the mass tamped into the mold, the tendency will exist to a certain extent for material to issue or pass out through the openings. While inconsiderable amounts of the material may thus tend to pass out, the small masses in the mold openings will tend to prevent the material from sliding out of the mold when it is sought to eject the molded product by pushing it at the smaller end. By making the openings triangular, the openings act as cutters to cut away the projecting parts of material and thereby permit easy removal of the cured product.

The sides 1, 2, 3 and 4 are bent over respectively at 7, 8, 9 and 10 to removably retain the small end 6. It is obvious that the end 6 may be removably retained in any other suitable manner, for example, it may be removably retained in the same way as end 5. The openings in the end 6 may either be circular or triangular as in the case of sides 1, 2, 3 and 4.

The end 5 is so proportioned that it can pass some distance into the large end of the mold and be held in pressed or fixed position by means of the rods 11 passing through the openings 12 in the sides 1 and 2. The end 5 may be provided with circular or triangular or other shaped openings. Any other suitable locking means may be used to hold the plate 5 against the packed or tamped material.

In practicing the process the moist or substantially dry mixture of finely divided lime and finely divided kieselguhr is tamped or packed into the mold through the large end against the walls 1, 2, 3, 4 and 6. The plate 5 is then placed above the material and locked in position by means of the rods 11 which are passed through a suitable pair of the openings 12. The mold and contents are then subjected to the action of steam in a container under a pressure of from 5 to 200 or more pounds per square inch for 4 to 70 hours as described above. The cured product, which is kieselguhr particles or kieselguhr containing material bound together by means of calcium silicate, in the manner indicated above, is removed from the mold by removing the rods 11 and applying a pushing force to the plate 6. Should the material project through or into the triangular openings, it is cut off in the manner indicated above by the sides of the openings themselves.

The triangular openings in the sides may be bevelled or sharpened on their edges to facilitate the cutting action and they may be varied in shape to accomplish the same function. For example they may be made in the form of slots with pointed ends, with or without sharpened edges, or they may be in the form of slots with curved ends, sufficiently narrow or sharpened to produce a cutting action upon the material projecting into the opening when pressure is applied to the plate 6 when the removal operation is accomplished.

The shape of the mold illustrated and described above may be varied according to requirements and the final product removed therefrom may be machined or cut into any desired shapes.

The porosity and lightness of the product may be increased by adding finely divided carbonaceous material such as fine charcoal, saw dust, sugar, cork dust, carbonaceous liquids as waste sugar solutions, and the like to the kieselguhr or the kieselguhr lime mixture before steaming or formation of the silicate and the product fired before use, and after removal from the molds, in a kiln to decompose by combustion the carbonaceous material to produce voids, or the material may be built into the structure desired and the structure fired from within or without depending upon the surface of the material desired to be rendered more porous and therefore more heat insulating. The carbonaceous material may also be absorbed in the already formed steamed cured material by immersing the latter in or contacting it with a liquid containing carbonaceous material, such as sugar solutions, oils or solutions of oils and the like.

The burning of the carbonaceous matter in addition to producing a more porous mass causes a partial sintering of the mass of kieselguhr particles already held together by calcium silicate and thereby reduces the shrinkage of the product to the point desired for the particular class of material being produced at the time. The amount of this pre-shrinkage can be increased or decreased by regulating the burning temperature by increasing or decreasing the amount of carbonaceous material used. The greater the amount of sintering or prior shrinkage of the diatoms the greater will be the temperature capable of being withstood by the product. The amount of carbonaceous matter introduced in the form described above may vary from about 3% to 20% or more parts for each 100 parts of kieselguhr lime mixture.

The sintering of the bound particles of kieselguhr may be also accomplished without the addition of the carbonaceous particles to promote combustion when it is possible to have available means for slowly heating the bodies up to the sintering temperature of the kieselguhr. In all such cases of sintering or partial fusion of the diatoms or particles the silicate bond holds the kieselguhr in the desired form until the sintering can be accomplished. As in many cases the sintering of the kieselguhr would seldom exceed 2200° F., it is evident that the firing or sintering of the product may be accomplished without removal from the mold and directly after steaming, by using metallic alloys or other refractory materials for the construction of the mold which would withstand this temperature.

The powdered kieselguhr used is preferably prepared by passing lumps of kieselguhr through a light hammer mill rather than through a grinder. This action tends to loosen particles of sand and other heavier matter from the pure kieselguhr diatoms. When substantially pure diatoms are desired, such divided mass is passed through a centrifugal air separator or other means to remove the sand as tailings which also contain some pure kieselguhr. It is kieselguhr substantially free from sand and other impurities, and consisting substantially only of unbroken or natural diatoms that I intend by the term cleaned kieselguhr referred to above, however, the present invention is not limited to the use of cleaned kieselguhr.

The lime used in the process is preferably used in the slacked condition, although it might be used in the unslacked condition. The lime used should be high in calcium oxide and might contain small amounts of magnesium oxide without impairing the product. The lime used should be preferably of a fineness greater than from 100 to 200 mesh and the kieselguhr should preferably be of a fineness corresponding to the size of the individual diatoms used or several multiples thereof, whereby groups of naturally adhering diatoms may be taken advantage of in the formation of the herein described product. As referred to above the kieselguhr is not ground, but disintegrated to the desired fineness, as in this manner the delicate natural structure so necessary to its insulation properties is substantially wholly retained. The produce therefore, includes the actual undestroyed diatoms. Grinding would destroy the natural structure of the diatoms and therefore produce a product of inferior insulating and filtering properties. It is obvious that diatoms separated in other suitable ways than described above may be used in the present process.

The quantities of lime used, as described above, either in the form of calcium oxide or calcium hydroxide, are regulated in amount as to leave substantially no excess of lime present, so that all lime is converted into calcium silicate for forming the binding agent to hold the natural substantially unbroken diatoms in a rigid porous heat and sound insulating mass. Instead of lime I may use an oxide or hydroxide of barium or strontium in corresponding stoichiometrical amounts, or other similar materials which form an insoluble binder of silicates when exposed to steam.

The terms alkali earth metal or alkaline earth metal occurring in the claims are used in the senses in which such terms are ordinarily used and in the additional sense that thereby magnesium is intended to be included except where the context indicates a different intention. The term oxide occurring in the claims is used in the sense in which such term is ordinarily used and in the additional sense that thereby hydroxides, hydrated oxides, or partially hydrated oxides are intended to be included, except where the context indicates a different intention. The term lime is used in the sense of including calcium oxide, calcium hydroxide and partially hydrated calcium oxide.

What I claim is:

1. The process of producing bodies containing united particles of kieselguhr which comprises confining a compact mass of a mixture of an oxide of an alkaline earth metal and kieselguhr in a steam permeable mold and subjecting the contents of the mold while in the compact condition and substantially free from any expansion in the mold to the action of steam at such a temperature as to promote the formation of an alkaline earth silicate.

2. The process of producing bodies containing united particles of kieselguhr which comprises forming a compact mass of a mixture including lime and kieselguhr in a steam permeable mold and subjecting the contents of the mold while in the compact condition and substantially free from any expansion in the mold to the action of steam at such a temperature as to promote the formation of a calcium silicate.

3. The process of producing bodies containing united particles of kieselguhr which comprises forming a mass of a mixture including lime and kieselguhr in a steam permeable mold and subjecting the contents of the mold while retaining the contents in a substantially unexpansible condition to the action of steam at at least a pressure of from about 5 to 200 pounds per square inch to promote the formation of calcium silicate.

4. The process of producing an artificial body which comprises confining a mass of a mixture including an oxide of an alkaline earth metal and kieselguhr in a mold, permitting the entry of steam, subjecting the mass within the mold while substantially preventing expansion of the mass within the mold to the action of steam at a pressure not substantially less than about 5 pounds per square inch for a period of from 4 to 70 hours.

5. The process of producing bodies containing united particles of kieselguhr which comprises forming a confined mass of a mixture including lime and kieselguhr in a steam permeable mold and subjecting the mass within the mold while preventing substantial expansion of the material within the mold to the action of steam at a pressure not substantially less than about 5 pounds per square inch for a period of from about 4 to 70 hours.

6. The process of producing an artificial body which comprises confining a compact mass of a mixture including an oxide of an alkaline earth metal and kieselguhr in a mold subjecting the mass while in the compact condition and substantially without expansion to the action of steam at such a temperature as to promote the formation of a silicate of the alkaline metal and thereafter sintering at least in part the body so formed without removal from the mold.

7. The process of producing bodies containing united particles of kieselguhr which comprises placing a compact mass of a mixture including lime and kieselguhr in a mold, subjecting the contents of the mold while in the compact condition and without substantial expansion to the action of steam at such a temperature as to promote the formation of a calcium silicate and thereafter sintering at least in part the body so formed without removal from the mold.

8. The process of producing bodies containing united particles of kieselguhr which comprises forming a confined mass of a mixture including lime and kieselguhr in a mold, subjecting the contents of the mold while retaining the contents in a substantially unexpansible condition to the action of steam at a pressure of not substantially less than 5 pounds per square inch for substantially 4 to 70 hours and thereafter sintering at least in part the body so formed without removal from the mold.

9. The process of forming bodies containing united particles of kieselguhr which comprises forming a body of kieselguhr particles united by means of a silicate of calcium and thereafter sintering in part at least the kieselguhr particles.

10. The process of producing an artificial body which comprises subjecting a mass of a mixture of diatomaceous earth and an oxide of an alkaline earth metal to the action of heat at such a temperature as to promote the formation of silicate of the alkaline earth metal, maintaining the mass substantially free from expansion in volume during the formation of the silicate and thereafter sintering at least in part the diatomaceous earth.

11. The process of forming bodies of united particles of kieselguhr which comprises forming a body of kieselguhr particles united by means of a silicate of calcium and thereafter sintering the thus formed mass to produce refractoriness to the extent desired for the use to which the material is to be put.

12. The process of forming artificial bodies which comprises forming a body of kieselguhr particles united by a silicate of an alkaline earth metal and interspersed with carbonaceous material and thereafter firing the body to produce at least some sintering of the kieselguhr particles.

13. The process of forming artificial bodies which comprises forming a body of kieselguhr particles united by a silicate of an alkaline earth metal, interspersing said body with a carbonaceous material and thereafter firing the body to produce at least some sintering of the kieselguhr particles.

14. The process of forming bodies containing united particles of kieselguhr which comprises forming a body of kieselguhr particles united by a silicate of calcium and interspersed with carbonaceous material and thereafter firing the body to produce at least some sintering of the kieselguhr particles.

15. At least partly sintered particles of diatomaceous earth preunited by a silicate of an alkaline earth metal.

16. At least partly sintered particles of diatomaceous earth preunited by a silicate of calcium.

17. The process of forming bodies containing united particles of diatomaceous earth which comprises uniting said particles by means of a substantially insoluble silicate and thereafter sintering at least in part the said particles.

18. The process of forming bodies containing united particles of diatomaceous earth which comprises first uniting said particles by means of silicate of calcium without the employment of a sintering action to form said silicate and thereafter partly sintering said particles.

19. The process which comprises forming a body of diatomaceous earth particles united by means of an unfused silicate of an alkaline earth metal and thereafter sintering at least in part the diatomaceous earth particles.

20. The process which comprises forming a body of diatomaceous earth particles united by means of an unfused calcium silicate and thereafter sintering at least in part the diatomaceous earth particles.

In testimony whereof I affix my signature.
LAWSON L. WAGNER.